United States Patent
Doron et al.

(10) Patent No.: US 11,409,956 B1
(45) Date of Patent: Aug. 9, 2022

(54) ASYNCHRONOUS AND SYNCHRONOUS LOCKING MECHANISM

(71) Applicant: monday.com Ltd., Tel Aviv (IL)

(72) Inventors: Omer Doron, Tel Aviv (IL); Liran Brimer, Ramat Gan (IL); Dor Yehuda, Hod Hasharon (IL); Yuly Roberman, Tel Aviv (IL); Eviathar Moussaffi, Tel Aviv (IL)

(73) Assignee: monday.com Ltd., Tel Aviv (IL)

( * ) Notice: Subject to any disclaimer, the term of this patent is extended or adjusted under 35 U.S.C. 154(b) by 0 days.

(21) Appl. No.: 17/565,697

(22) Filed: Dec. 30, 2021

(51) Int. Cl.
*G06F 40/18* (2020.01)
*G06F 16/23* (2019.01)
*G06F 16/2455* (2019.01)

(52) U.S. Cl.
CPC .......... *G06F 40/18* (2020.01); *G06F 16/2343* (2019.01); *G06F 16/2365* (2019.01); *G06F 16/2386* (2019.01); *G06F 16/24565* (2019.01)

(58) Field of Classification Search
CPC ............. G06F 16/2343; G06F 16/2365; G06F 16/2386; G06F 16/24565
USPC .......................................... 707/704; 715/216
See application file for complete search history.

(56) References Cited

U.S. PATENT DOCUMENTS

| | | | | |
|---|---|---|---|---|
| 9,009,709 | B2* | 4/2015 | Long | G06F 16/2435 |
| | | | | 718/100 |
| 9,336,262 | B2* | 5/2016 | Lee | G06F 16/2379 |
| 2010/0228705 | A1* | 9/2010 | Labuda | G06F 16/21 |
| | | | | 707/700 |
| 2015/0278282 | A1* | 10/2015 | Sardina | G06F 16/2343 |
| | | | | 707/704 |
| 2015/0304264 | A1* | 10/2015 | Kabbes | H04L 51/22 |
| | | | | 709/206 |
| 2021/0064573 | A1* | 3/2021 | Rao | G06F 16/23 |

* cited by examiner

*Primary Examiner* — Michael Pham

(57) ABSTRACT

There is provided a system for dynamically updating data in dataset, comprising: at least one processor executing a code for: receiving an indication of trigger for a change of a first cell of cells of a dataset, updating the first cell according to the trigger, determining a second cell dependent on the first cell, sending to the second cell, an event message indicating the update of the first cell, locking a column of cells that include the second cell and other cells, and re-computing values of the second cell and other cells of the locked column, by performing a batch update of the cells of the locked column according to the event message, and according to additional event messages sent to the cells of the locked column that received before the locking and/or received during the locking.

20 Claims, 7 Drawing Sheets

ASYNCHRONOUS AND SYNCHRONOUS LOCKING MECHANISM

RELATED APPLICATIONS

The present application is related to and being co-filed with U.S. Patent Applications having Ser. No. 17/565,731, titled "SERVER SIDE NEAR REAL TIME ACCUMULATION BASED ON RELATION GRAPH", and Ser. No. 17/565,767, titled "CLIENT-SIDE SORTING AND UPDATING OF PAGINATED DATA OBTAINED FROM A SERVER", the contents of which are incorporated herein by reference in their entirety.

BACKGROUND

The present invention, in some embodiments thereof, relates to client-server interactions and, more specifically, but not exclusively, to datasets hosted by the server and accessed by a client terminal.

A client terminal accesses a data set hosted by a server using a web browser. The server sends the entire dataset to the client terminal, for local storage. The web browser is used by a user to view the locally stored dataset, and/or update the locally stored dataset.

SUMMARY

According to a first aspect, A system for dynamically updating data in dataset, comprising: at least one processor executing a code for: receiving an indication of trigger for a change of a first cell of a plurality of cells of a dataset, updating the first cell according to the trigger, determining a second cell dependent on the first cell, sending to the second cell, an event message indicating the update of the first cell, locking a column of a plurality of cells that include the second cell and a plurality of other cells, and re-computing values of the second cell and plurality of other cells of the locked column, by performing a batch update of the cells of the locked column according to the event message, and according to additional event messages sent to the plurality of cells of the locked column that are at least one of: received before the locking, and received during the locking.

According to a second aspect, A method of dynamically updating data in dataset, comprising: receiving an indication of trigger for a change of a first cell of a plurality of cells of a dataset, updating the first cell according to the trigger, determining a second cell dependent on the first cell, sending to the second cell, an event message indicating the update of the first cell, locking a column of a plurality of cells that include the second cell and a plurality of other cells, and re-computing values of the second cell and plurality of other cells of the locked column, by performing a batch update of the cells of the locked column according to the event message, and according to additional event messages sent to the plurality of cells of the locked column that are at least one of: received before the locking, and received during the locking.

According to a third aspect, a non-transitory medium storing program instructions for dynamically updating data in dataset, which, when executed by at least one processor, cause the at least one processor to: receive an indication of trigger for a change of a first cell of a plurality of cells of a dataset, update the first cell according to the trigger, determine a second cell dependent on the first cell, send to the second cell, an event message indicating the update of the first cell, lock a column of a plurality of cells that include the second cell and a plurality of other cells, and re-compute values of the second cell and plurality of other cells of the locked column, by performing a batch update of the cells of the locked column according to the event message, and according to additional event messages sent to the plurality of cells of the locked column that are at least one of: received before the locking, and received during the locking.

In a further implementation form of the first, second, and third aspects, the re-computing values of the locked second cells of a triggers a propagation implemented in at least one iteration, wherein the re-computed values of the locked column represents the indication of trigger for change of a third cell of the plurality of cells of the dataset, wherein the determining comprises determining a fourth cell dependent on the third cell, wherein the sending comprises sending to the third cell, wherein locking comprises locking the column that includes the third cell, and wherein re-computing comprises re-computing values of the third cell.

In a further implementation form of the first, second, and third aspects, the event message is at least one of synchronously and asynchronously generated in response to the receiving the indication of the change.

In a further implementation form of the first, second, and third aspects, the batch update of the plurality of locked cells is performed asynchronously with respect to the receiving the indication of the change.

In a further implementation form of the first, second, and third aspects, further comprising code for releasing the locking when a queue of the additional event messages has been processed and implemented as the batch update.

In a further implementation form of the first, second, and third aspects, further comprising code for updating a presentation of at least one second dataset presented on a display of at least one client terminal, for including the updated plurality of cells that include the at least one second cell.

In a further implementation form of the first, second, and third aspects, a dataset comprises a board including at least one table of the plurality of cell arranged as columns.

In a further implementation form of the first, second, and third aspects, the locking is released after a preselected amount of time has elapsed.

In a further implementation form of the first, second, and third aspects, new event messages arriving after the release of a current locking are queued until a next locking, and updates indicated by the new event messages are performed during the next locking.

In a further implementation form of the first, second, and third aspects, the locking is triggered at predefined time intervals.

In a further implementation form of the first, second, and third aspects, the plurality of cells are locked in response to a first event message, and additional updates indicated by additional event messages sent during while the plurality of cells are locked are performed on the locked cells without triggering additional locking.

In a further implementation form of the first, second, and third aspects, the indication of trigger for change to the first cell is selected from a group consisting of: direct a change of a value of the first cell, an indirect change of the value of the first cell due to a change of another cell linked to the first cell, a configuration change impacting the first cell, a change in linkage of the first cell, a change of time used for computation by the first cell, a change in entity assigned to the first cell, a change in a definition of an automated task impacting the first cell, and a force recalculation of a formula impacting the first cell.

In a further implementation form of the first, second, and third aspects, updating the plurality of locked cells is selected from a group consisting of: assigning the value of the event message to a mirror cell, updating a filter applied to the plurality of cells using the value of the event message, updating an aggregation computation, automating a task using the value of the event message, and sorting the plurality of cells using the value of the event message.

In a further implementation form of the first, second, and third aspects, the batch update of the plurality of locked cells is done by applying a diff operator to a previous value of each respective cell and to the respective change indicated by the respective event message.

In a further implementation form of the first, second, and third aspects, the first cell is of a first dataset, and the second cell dependent on the first cell is of a second dataset different from the first dataset.

In a further implementation form of the first, second, and third aspects, the indication of the trigger for change of the first cell is received from a first client terminal presenting the first dataset, and the at least one second dataset that is updated is presented a respective display of at least one second client terminal different from the first client terminal.

In a further implementation form of the first, second, and third aspects, further comprising code for: accumulating in a first queue, event messages indicating a plurality of changes to a plurality of first cells, and accumulating in a second queue, a plurality of event messages indicating columns that include a plurality of second cells to be updated with the event messages.

In a further implementation form of the first, second, and third aspects, sending comprises distributing the event message to respective columns of a respective dataset that include a respective second cell dependent on the first cell, to trigger locking of cells of each respective column.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
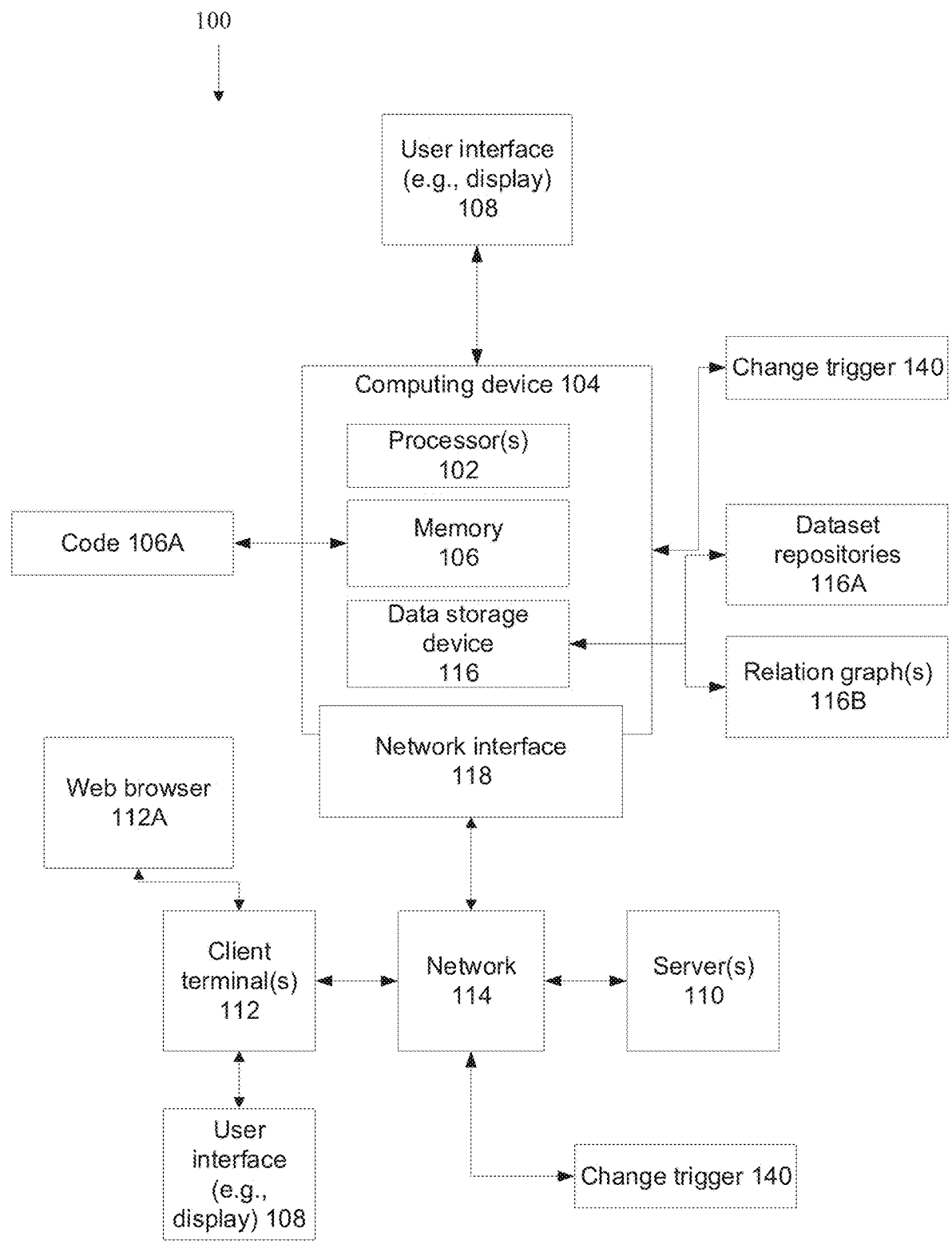
FIG. 1 is a block diagram of a system for dynamically updating data in a dataset by locking multiple cells for performing a batch update, in accordance with some embodiments of the present invention.

The present invention, in some embodiments thereof, relates to client-server interactions and, more specifically, but not exclusively, to datasets hosted by the server and accessed by a client terminal.

As used herein, the term "cell" and "column" are exemplary implementations, and not necessarily limiting. For example, other data structures may be implemented.

An aspect of some embodiments of the present invention relates to systems, methods, devices, and/or code instructions (e.g., stored on a memory and executable by one or more hardware processors) for dynamically updating data in dataset, optionally by a server. The dynamic update is designed to be performed in a computationally efficient manner, to enable scaling of the dataset to very large sizes without computationally overloading the client terminal, for example, one or more tables that includes thousands (or tens of thousands, or hundreds of thousands, or more) of rows and/or columns. The server stores and/or manages the dataset(s), which include records each with multiple fields implemented as cells. The dataset(s) is optionally implemented as one or more tables of rows and columns of cells. The dataset(s) are accessed by one or more client terminals in network communication with the server. The client terminal(s) may view and/or manipulate the datasets, for example, change value(s) of cell(s), define/change automated tasks, define/change aggregations, define/change cell dependencies, define/change formulas, define/change cell definitions, apply a filter, apply a sort, and the like.

An indication triggering a change to a parent cell of the dataset is obtained, for example, trigger by an external entity such as an external clock sending time triggers, triggered by input from the client terminal(s), triggered by another cell on which the parent cell is dependent, and/or triggered by an external database that sends updated data to the cell. The parent cell is updated according to the triggered change. One or more cells dependent on the parent cell that has changed are identified. The dependent cells may be of the same dataset, and/or of another dataset, for example, viewed and/or accessed by client terminal(s) different from the client terminal accessing and/or viewing the dataset of the parent cell. An event message indicating the update to the parent cell is sent to the identified dependent cell(s), for updating thereof. The column, which includes the dependent cell(s) and other others, is locked. The dependent cell(s) and other cells of the locked column (which have event messages) are updated. The update may be performed as a batch update of the cells of the locked column. The batch update is done according to the event message, and according to any additional event messages sent to the other locked cells of the locked column. The additional event messages used to perform the batch update may be received before the locking, and/or received during the locking.

Optionally, the update of the cells of the locked column triggers a propagation of change, implemented using one or more additional iterations. The updating of the cells of the locked column represents another trigger for change. In the next iteration, other cells which are dependent on the cell(s) of the locked column which have been updated, are determined. The event messages are sent to the other cells, triggering a locking of other column(s) of the other cells, and batch update of the other column(s). Multiple iterations may be propagated, until all dependencies have been traced, and all updates according to all traced dependencies have been computed.

Additional details of identifying the dependent cells for updating, and/or the updating of the locked cells of the locked column using an accumulated approach and/or a differential operation, are described, for example, with reference to U.S. patent application Ser. No. 17/565,731, by common inventors of the present application, which is co-filed with the present application, and is incorporated herein by reference in its entirety.

At least some implementations of the systems, methods, apparatus, and/or code instructions described herein address the technical problem of updating values of cells in a dataset in a computationally efficient manner. At least some implementations of the systems, methods, apparatus, and/or code instructions described herein improve the technical field of client-server interactions. Using standard approaches, when a certain cell of a dataset is to be updated, the certain cell is locked (e.g., to avoid situations where an old value is used or viewed while the new value already exists). Such standard approach is impractical for large datasets with a large number of cells, and/or where a large number of cells are dynamic with iterative updates, such as real time updates. Standard approaches of locking specific cells applies to large datasets are non-scalable, since as the size of the dataset increases, and/or as the number of cells that are repeatedly updates increases, the number of cells that are repeatedly locked increases. The large number of locking of cells creates long latency, which results in a poor user experience of a user viewing and/or using the dataset. Moreover, the large number of locking operations are computationally inefficient, especially if performed client-side.

At least some implementations of the systems, methods, apparatus, and/or code instructions described herein provide a solution to the technical problem, and/or improve the technical field, by locking multiple cells of multiple records, where the cells are of the same field. For example, where the dataset is implemented as a board of cells, the locking is done for the entire column, where each column includes multiple rows (e.g., records) such as of different entities. Now, during a single locking session of a whole column, multiple updates of multiple cells of the columns are performed during the single locking session. The locking of the whole column, rather than of individual cells, reduces latency, enabling near real time updates of the cells. Moreover, the locking of the whole column, rather than of individual cells, increasing computational efficiency of the processor, since the number of operations performed is reduced. For example, when there are 50 changes to a certain column (e.g., for 50 cells, or multiple changes to multiple cells), all 50 changes are executed as a batch, during a single locking session. This is in contract to standard approaches, which would require 50 different locking operations, which incurs long latency and/or requires significant processing and/or memory resources.

Moreover, locking the entire column and then executing multiple changes to affected cells enables performing the updating of the cells asynchronously with respect to detected changes to the cells. For example, the locking of the column may be done every predefined amount of time, and/or for a selected amount of time in response to receiving the first update, and/or until all queued jobs have been executed. The asynchronous locking of the column provides the user with a near real time synchronous experience, where the columns are updated in near real time in response to changes of cells that impact the column(s). The initial locking of the column may be done synchronously and/or asynchronously, in response to receiving an indication of an update of a certain cell of the column. Update of other cells in the column may be done asynchronously, using event messages that have been already queued, and/or using event messages that arrive during the locking session.

At least some implementations of the systems, methods, apparatus, and/or code instructions (stored on a data storage device and executable by one or more hardware processors) described herein address the technical problem of providing scalability to client terminals accessing datasets stored on a server. The datasets may be referred to herein as boards, which may be implemented as rows and columns of cells. For example, each row is for a different entity, and the columns are for different properties, where each cells of each column are for a specific property of the multiple entities. The technical problem may relate to increasing computational efficiency of the server that updates the dataset which is accessed by the client terminal for presenting the board on a display of the client terminal. The technical problem may relate to updating extremely large boards, for example, with millions of rows and thousands of columns, in contrast, for example, to standard approaches where board size is much more limited. The technical problem may relate to providing a scalable architectures that supports one or more of: automation on aggregation of formula (e.g., applied to a column), scroll (e.g., pagination) with sort and filter, fast dashboards, interface (e.g., API) for aggregations and/or aggregation changes, and formula for third party developers (e.g., apps). The technical problem may relate to providing fast user experience in accessing the board and/or performing operations using the boards, for example, the user changes a value of a cell, and linked cells are quickly updated.

Using existing approaches, the entire dataset is sent over a network to each client terminal accessing the dataset. The dataset is locally saved by each client terminal. The dataset locally stored by the client terminal is accessed by the browser running on the client terminal, for location presentation and manipulation by the client terminal. Manipulations of the dataset, for example, sort, filter, accumulation operations, and execution of automated tasks, are performed by a respective browser on each respective client terminal. Such architecture performs efficiently for small datasets, where the network is able to transfer the dataset within a reasonable amount of time, and the processing hardware and storage device (e.g., memory) of the client terminal is able to present and process the dataset within a reasonable amount of time. However, increased size of the dataset slows down the client terminal, limiting the size of the board that may be practically implemented. Latency, due to the network sending the dataset and/or capability of the processing hardware and/or memory of the client terminal executing the dataset, increases as the board size increases and/or as complexity of the board increases, resulting in an impractical user experience where a user changes a value of a cell, and needs to reload the board and/or wait for a long time until linked cells are updated. Complexity of the board relates to, for example, cross board links where cells of one board mirror cells of another board, formulas that depend on values computed by multiple cells, aggregation functions that depend on values computed by multiple cells, and linkage between cells, where a single mirror cells monitors values of multiple cells, and/or where a single cell is monitored by multiple mirror cells which may be on different boards. Such complex interactions between cells do not scale well using standard approaches.

Even if the updating is done server-side rather than client-side, updating using existing approaches is not scalable, especially when the board is very large and/or being updated with a large number of updates and/or being rapidly updated (e.g., continuously fed data, data fed at a rapid rate). Implementations described herein improve efficiency of the server performing the updates, providing scalability for large dataset and/or datasets that are rapidly updated and/or updated with a large number of updates, as described herein.

Use cases that involve large boards and/or complex interactions within the board cannot be practically implemented, for example, CRM lead boards that generate thousands of new leads per day, e-commerce websites that wish to manage their sales to analyze data using filters and build real time dashboards, factories/companies/other organizations that wish to manage complex production workflows using large connected boards.

At least some implementations of the systems, methods, apparatus, and/or code instructions described herein provide a solution to the above mentioned technical problem(s) and/or improve the technical field of management of datasets, by providing scalable datasets, for example, on the order of millions of rows and/or thousands of columns. The solution and/or improvement is based on storage of the dataset by the server, and execution of computations by the server, rather by the client terminal, and transmitting the relevant results from the server to the client, rather than having the client terminal re-load the entire dataset and/or re-compute a large amount of computations. Functions, for example, filtering, aggregation of data, and execution of automated tasks, are performed by the server, with the end result being provided to the client terminal, rather than the functions being performed by the client terminal.

Exemplary improvements include: enabling very large boards to be accessed and implemented by one or more client terminals (e.g., millions of rows and/or thousands of columns), filter and/or sort on any column combination, mutable data, low latency, pagination, availability of the dataset, reliability of the dataset, aggregation on server-side, fast load time on the client terminal even for very large boards, calculating mirror and formula cells by the server, allowing to filter and sort calculated columns, and exposing formula and aggregations to automations and third party developers.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
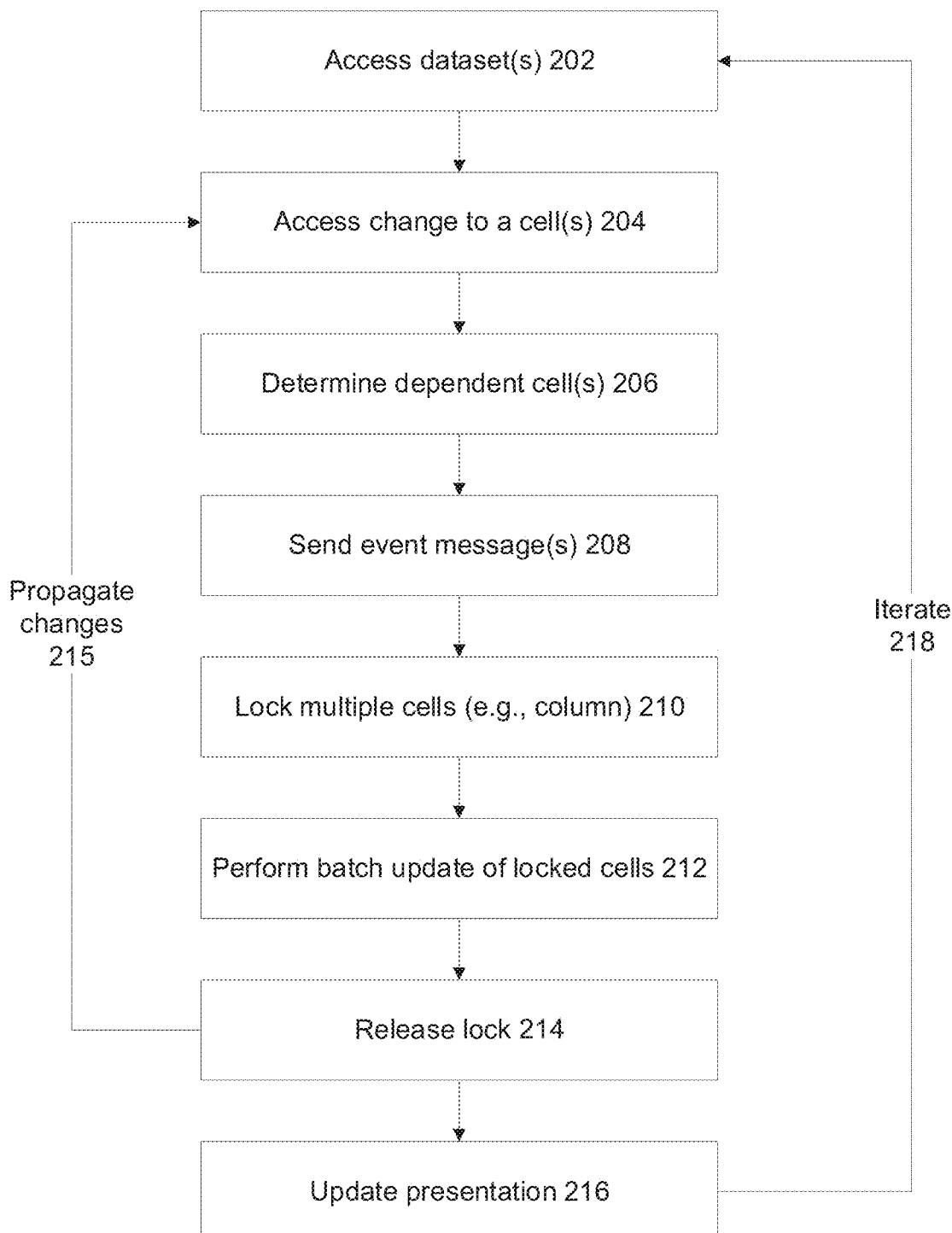
FIG. 2 is a flowchart of a method of dynamically updating data in a dataset by locking multiple cells for performing a batch update, in accordance with some embodiments of the present invention.
Figure 3:
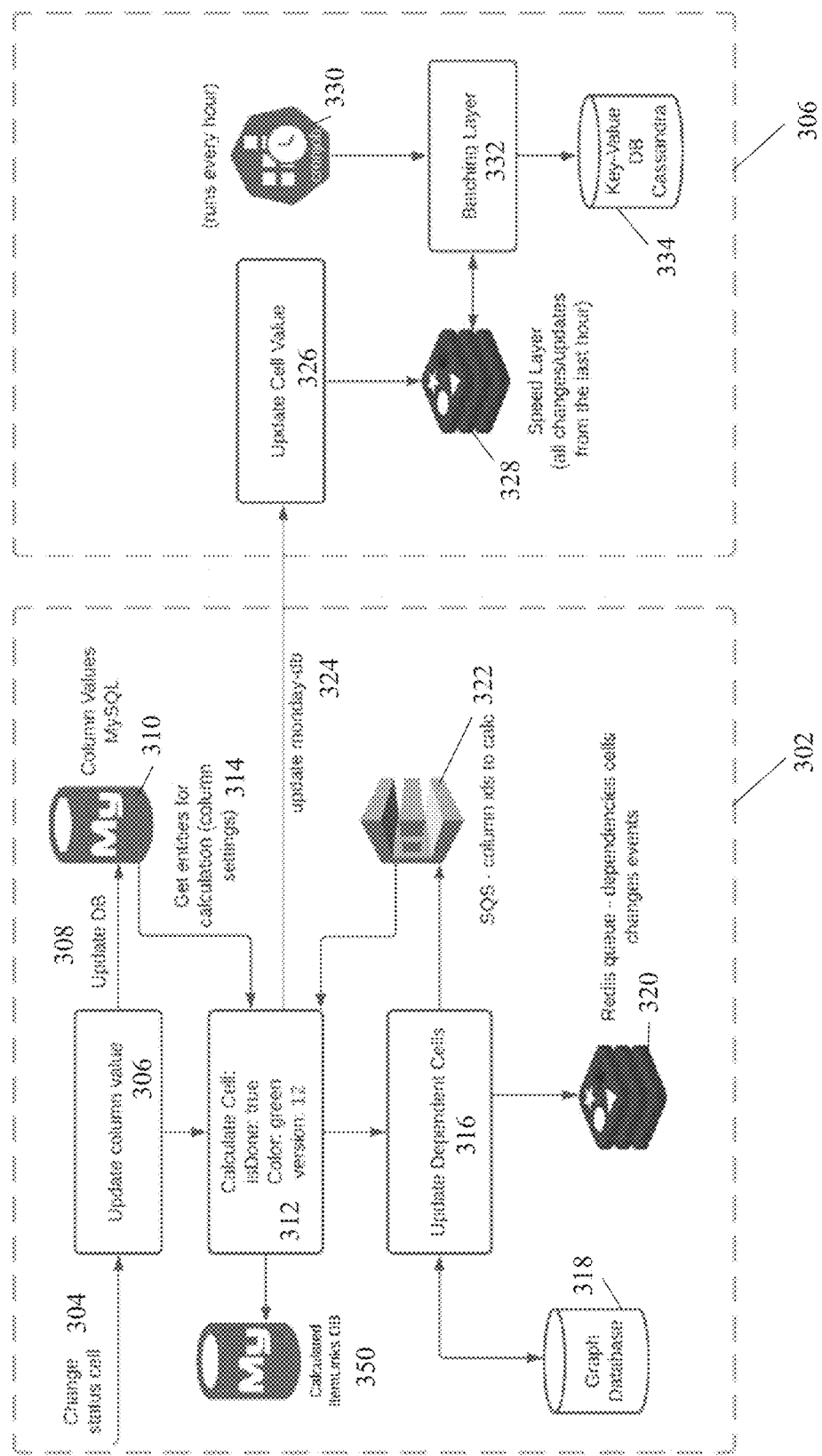
FIG. 3 is a high level exemplary dataflow of exemplary triggers in response to a change in cell status, in accordance with some embodiments of the present invention.
Figure 4:
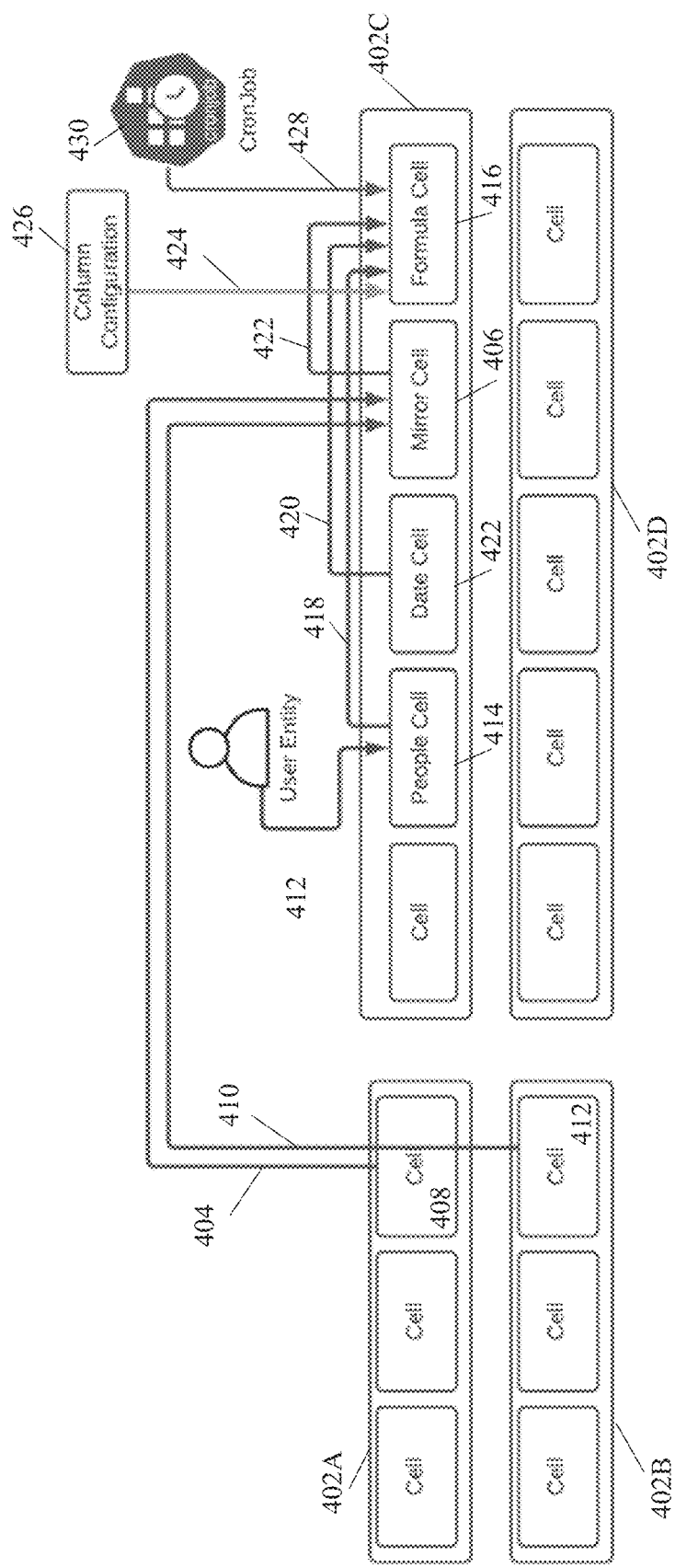
FIG. 4 depicts examples of dependencies documented in the relational graph, in accordance with some embodiments of the present invention.
Figure 5:
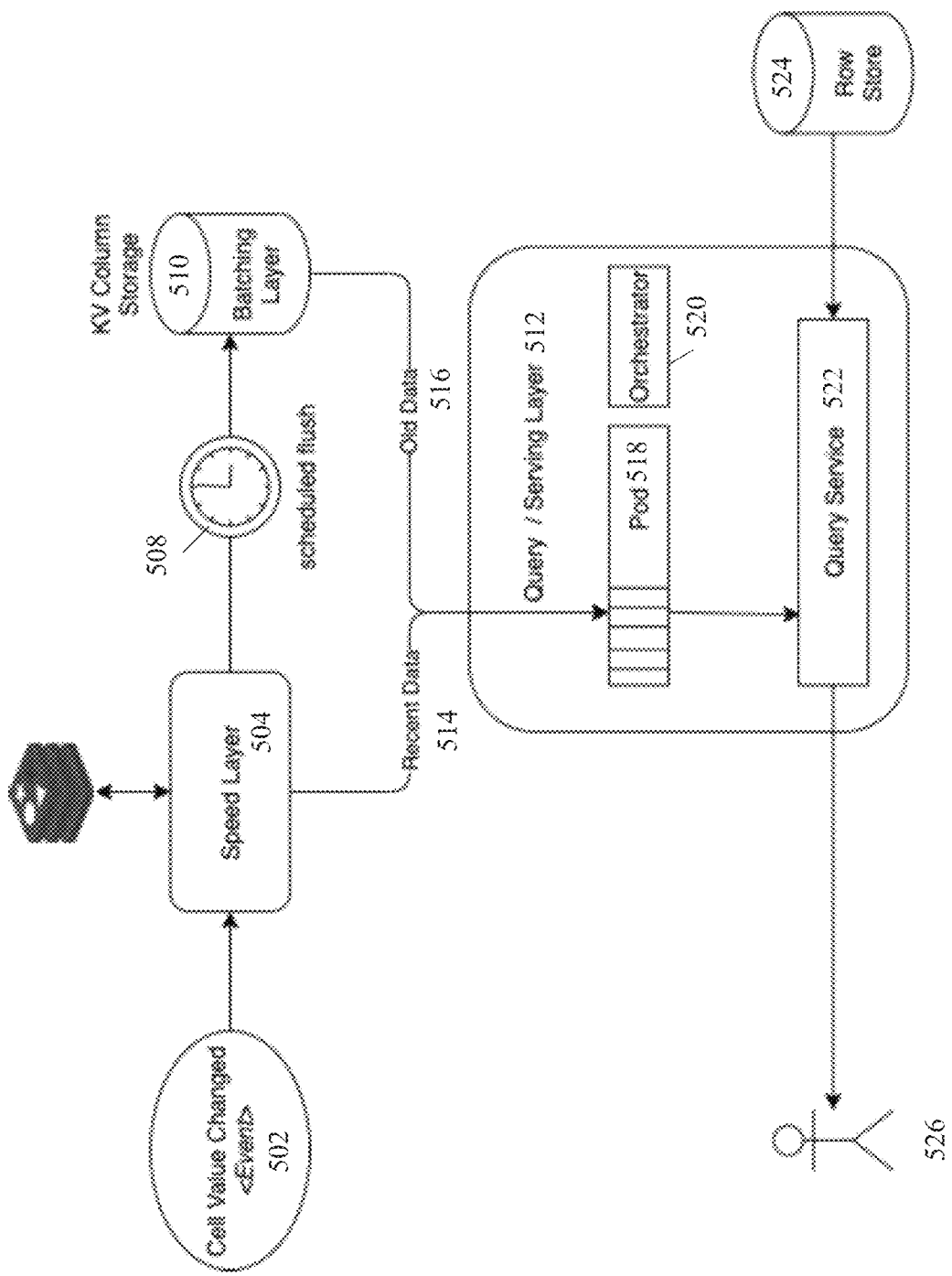
FIG. 5 is an exemplary dataflow for execution of a query on the dataset storing changes of cell values in a speed layer and a batching layer, in accordance with some embodiments of the present invention.
Figure 6:
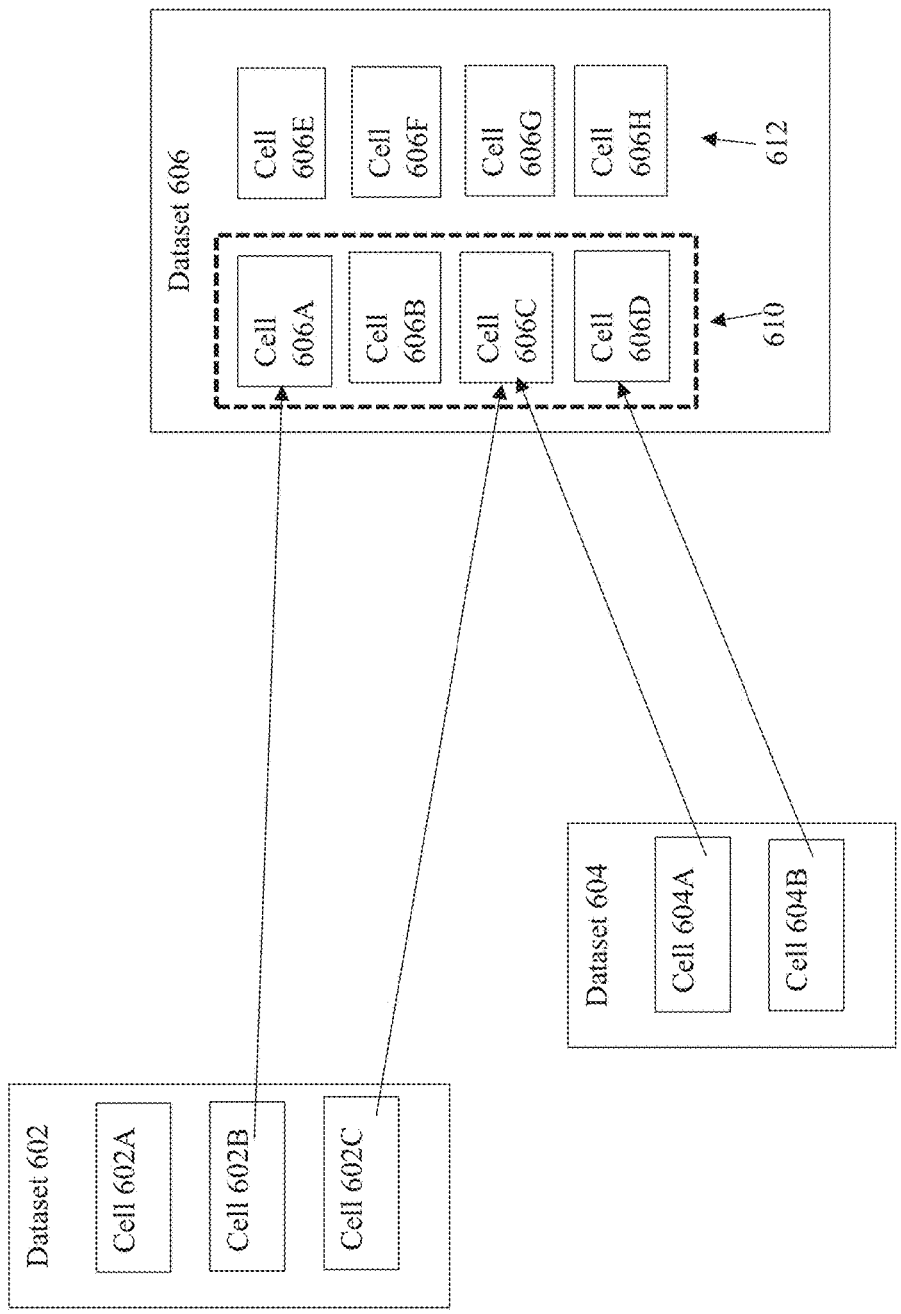
FIG. 6 is a schematic depicting locking of a column for batch update of cells of the column, in accordance with some embodiments of the present invention.
Figure 7:
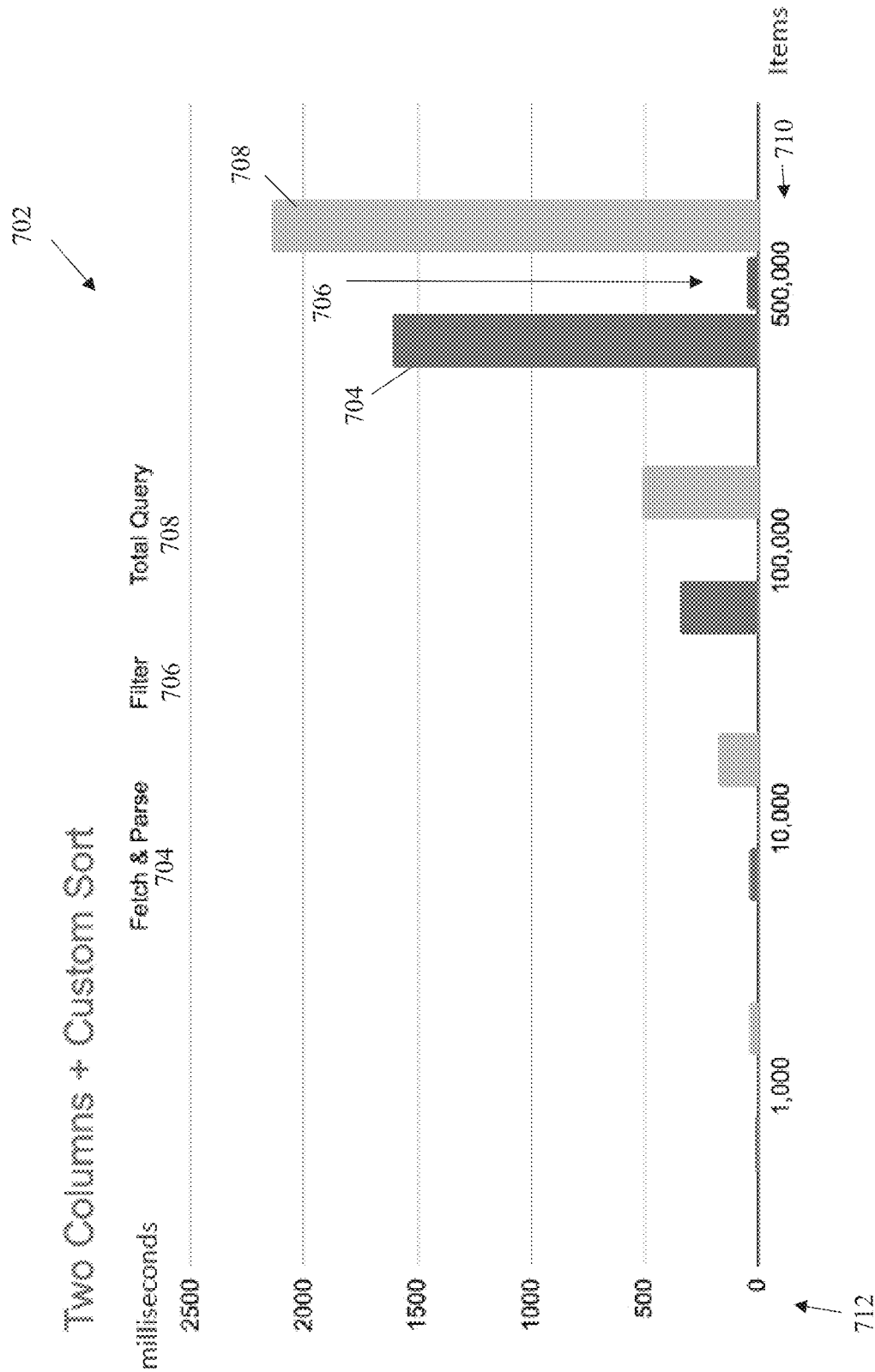
FIG. 7 is a graph depicting measurements made by Inventors as part of an experiment, to measure time it takes for a browser accessing a dataset managed by a server to present results, in accordance with some embodiments of the present invention.

Reference is now made to FIG. 1, which is a block diagram of a system for dynamically updating data in a dataset by locking multiple cells for performing a batch update, in accordance with some embodiments of the present invention. Reference is also made to FIG. 2, which is a flowchart of a method of dynamically updating data in a dataset by locking multiple cells for performing a batch update, in accordance with some embodiments of the present invention. Reference is also made to FIG. 3, which is a high level exemplary dataflow of exemplary triggers in response to a change in cell status, in accordance with some embodiments of the present invention. Features described with reference to FIG. 2 may represent exemplary details of portions of the flow described with reference to FIG. 3. Reference is now made to FIG. 4, which depicts examples of dependencies documented in the relational graph, in accordance with some embodiments of the present invention. Reference is now made to FIG. 5, which is an exemplary dataflow for execution of a query on the dataset storing changes of cell values 502 in a speed layer 504 and a batching layer 506, in accordance with some embodiments of the present invention. Reference is now made to FIG. 6, which is a schematic depicting locking of a column for batch update of cells of the column, in accordance with some embodiments of the present invention. Reference is also to FIG. 7, which is a graph 702 depicting measurements made by Inventors as part of an experiment, to measure time it takes for a browser accessing a dataset managed by a server to present results, in accordance with some embodiments of the present invention.

System 100 may implement the acts of the method described with reference to FIG. 2-7, by processor(s) 102 of a computing device 104 executing code instructions (e.g., code 106A) stored in a memory 106.

Change trigger 140 represents an internal and/or external component that triggers changes to cell(s) of the dataset. Examples of change trigger 140 include: processes stored on memory 106 and executed by processor 102, client terminal 112, server 110, an external database that feeds data to the cell, and a time process that sends time based triggers (e.g., every hour), and the like. Exemplary changes triggered by change trigger 140 are described herein.

Computing device 104 may be implemented as, for example, one of more of: a server, and a computing cloud. Computing device 104 may include a single computing device, and/or a group of computing devices arranged in parallel.

Client terminal(s) 112 access one or more datasets stored and managed by computing device 104, optionally using a web browser 112A presented the dataset on a user interface 108 (e.g., display). Client terminal(s) may be implemented, for example, as a mobile device, a stationary device, a kiosk, a smartphone, a laptop, a tablet computer, a wearable computing device, a glasses computing device, a watch computing device, and a desktop computer.

Server(s) 110 may feed data into datasets stored and managed by computing device 104. Server(s) may be implemented as, for example, a network server, a web server, a storage server, a local server, a remote server, and a computing cloud.

Computing device 104 includes one or more processor(s) 102, implemented as for example, central processing unit(s) (CPU), graphics processing unit(s) (GPU), field programmable gate array(s) (FPGA), digital signal processor(s) (DSP), application specific integrated circuit(s) (ASIC), customized circuit(s), processors for interfacing with other units, and/or specialized hardware accelerators. Processor(s) 102 may be implemented as a hardware processor. Processor(s) 102 may be implemented as a single processor, a multi-core processor, and/or a cluster of processors arranged for parallel processing (which may include homogenous and/or heterogeneous processor architectures). It is noted that processor(s) 102 may be designed to implement in hardware one or more features stored as code instructions 106A.

Memory 106 stores code instructions executable by processor(s) 102, for example, a random access memory (RAM), dynamic random access memory (DRAM) and/or storage class memory (SCM), non-volatile memory, magnetic media, semiconductor memory devices, hard drive, removable storage, and optical media (e.g., DVD, CD-ROM). Storage device 106 stores, for example, one or more of: code 106A that implements one or more features and/or acts of the method described with reference to FIGS. 2-7 when executed by processor(s) 102.

Computing device 104 may include a data storage device 116 for storing data, for example, dataset repositories 116A, which include one or more datasets described herein, for example, one or more datasets of data setup by a user (e.g., a low level board of raw data, and a high level board linked the low level board for presenting real time aggregation summaries of the raw data), a relational graph(s) 116B that maps between dependent cells (e.g., mirror cells and cells being mirrored, mirror cells and formula cells), and other dataset described herein. Data repository 116 may be implemented as, for example, a memory, a local hard-drive, virtual storage, a removable storage unit, an optical disk, a storage device, and/or as a remote server and/or computing cloud (e.g., accessed using a network connection).

Computing device 104 may include a network interface 118 for connecting to network 114, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Network 114 may be implemented as, for example, the internet, a local area network, a virtual private network, a wireless network, a cellular network, a local bus, a point to point link (e.g., wired), and/or combinations of the aforementioned.

Computing device 104 may connect using network 114 (or another communication channel, such as through a direct link (e.g., cable, wireless) and/or indirect link (e.g., via an intermediary computing unit such as a server, and/or via a storage device) with server(s) 110 and/or client terminal(s) 112.

Computing device 104 and each client terminal 112 may include and/or be in communication with one or more physical user interfaces 108 that include a mechanism for a user to enter data (e.g., enter filter, define automated task, link cells) and/or view data (e.g., the board), optionally within a GUI. Exemplary user interfaces 108 include, for example, one or more of, a touchscreen, a display, a keyboard, a mouse, and voice activated software using speakers and microphone.

Referring now back to FIG. 2, at 202, one or more datasets managed by the server are accessed and/or provided. The dataset(s) may be locally stored by the server. The primary dynamic updating of the dataset(s) is performed server side, as described herein.

At least some embodiments disclosed herein include devices, systems, and methods for collaborative work systems that may allow a user to interact with information in real time stored and/or presented in a dataset. At least some embodiments disclosed herein may allow a user to structure the dataset in many ways with the same building blocks to represent what the user wants to manage and how the user wants to manage it. This may be accomplished through the use of dataset(s).

A dataset may include a board and/or the dataset of the dataset may be presented in one or more boards. A board may include data from one or more datasets and/or other boards. A board may be a table with items, also referred to herein as "cells", (e.g., individual items presented in horizontal rows) defining objects or entities that are managed in the platform (task, project, client, deal, etc.). Unless expressly noted otherwise, the terms "dataset", "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and a vertical presentation. A table or tablature as used herein, refers to data presented in horizontal and vertical rows, (e.g., horizontal rows and vertical columns) defining cells in which data is presented. While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using for example static or dynamic graphical representations. A dashboard may also include multiple non-table forms of presenting data. Such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location, on a common board. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

The dataset managed by the server may be referred to herein as a primary dataset.

One or more client terminals access a server over the network for accessing the dataset(s) stored and/or managed by the server. Multiple client terminals may access the same dataset, with each client terminal applying different operations to the same dataset, for example, sort and/or filter. The different sort and/or filter results applied to the same dataset are presented on the display of each respective client terminal. Changes made to one or more cells by a certain client terminal are dynamically updated, and presentations of a dataset presenting the changed cells and/or other datasets presenting dependent cells linked to the change cell, presented on displays of other client terminals, are dynamically updated, as described herein.

In response to an access of the dataset by a certain client terminal, a real time copy of the dataset may be sent to the client terminal from the server, for local storage by the client terminal, for example, in a cache. A browser running on the client terminal is used to browse the cached copy of the dataset on the client terminal. Cells of the dataset are dynamically updated.

The dataset includes multiple records, each having multiple fields, implemented as cells. In an exemplary implementation, the dataset is implemented on a board, as one or more tables of cells. The records are implemented as rows of cells, and the fields are implemented as columns of cells.

Cells may be linked to one another, on the same board, or on different boards, of the same dataset, and/or of different datasets. For example, a first cell may depend on a second cell. A third cell may depend on the second cell.

Cells may be mapped to mirror cells, which reflect changes to values of the cells from which they depend from.

Cells may be associated with a definition based on values of other cells, for example, a formula (mathematical equation based on values of other cells), an aggregation (e.g., what percentage of cells of a column have completed their calculations, and what percentage are stuck or still working, for example, 90% complete, and 10% stuck), and automation of task (e.g., send an email when all cells of a column have completed their calculations).

Mirror cells and cells with definitions may be different cells that are dependent on one another. Definition cells may be are dependent on mirror cells. For example, the mirror cell is dependent on multiple cells of another board, and the dependent cells obtains the values of the multiple cells from the mirror cells, on which a formula is applied, and/or an automation is applied.

Optionally, a monitoring dataset monitors a state of a certain cell for identifying whether the certain cell has completed calculations, and updates a dependent cell according to the monitoring.

Large complex boards may be defined, where some boards obtain data from other boards, cells are dependent on one another in complex links, and formulas and/or automations are applied, for example, to present dashboards summarizing data, and/or trigger automated tasks.

Optionally, the primary copy of the dataset (i.e., managed by the server) is stored as a combination of a speed layer (i.e., dataset) and a batching layer (i.e., dataset). The speed layer documents accumulated changes to cells of the primary dataset occurring during a current time interval, for example, a current half hour, or hour, or 2 hours or 4 hours, or other time interval. The batching layer documents accumulated historical changes to cells of the primary dataset, i.e., that occurred before the current time interval. In response to the current time interval iteratively elapsing, the batching layer is iteratively updated with the accumulated changes documented by the speed layer. The speed layer may be reset. For example, every hour, the accumulated changes documented in the speed layer are combined with the accumulated changes documented in the batching layer. The speed layer documents and accumulates the new changes that occur during the next hour.

In response to a request from the client terminal to access the primary copy of the dataset, a copy of the dataset may be provided to the client terminal. The copy provided to the client terminal is obtained by computing real time values of cells, as a combination of historical accumulated updates documented in the batching layer and recent accumulated changes documented in the speed layer. The copy may be stored on a memory of the client terminal, for fast access by a browser running on the client terminal.

At 204, a trigger for a change(s) to one or more cell(s) of the dataset(s) managed by the server is received and/or accessed. The trigger for change may be from the change trigger component, as described herein.

The changes may be triggered due to the client terminal, another client terminal, the server, and/or an external entity (e.g., clock, external database feeding data). For example, for a dataset managed by the server, change to cell(s) of a copy of a dataset loaded on a browser of a client terminal in network communication with the server, is monitored.

Exemplary changes include: a direct a change of a value of the cell (e.g., user manually changes a value of the cell), an indirect change of the value of the cell due to a change of another cell linked to the cell (e.g., a cell computing a formula changes result when one of the input values from another cell changes), a configuration change impacting the cell (e.g., change in configuration of a column that includes the cell), a change in linkage of the cell (e.g., dependency on cell is changed), a change of time used for computation by the cell (e.g., clock sends trigger every hour), a change in entity assigned to the cell (e.g., assign to different user), a change in a definition of an automated task impacting the cell, and a forced recalculation of a formula impacting the cell.

At 206, cells dependent on the changed cell are identified. The dependent cells may be on the same board and/or same dataset, and/or or different board(s) and/or different dataset(s).

There may be bidirectional dependencies between cells. A first unidirectional dependency defines which cell(s) is dependent on the cell that has changed value. For example, a first on a first board has changed. A second cell on a second board is set as a mirror that depends on the first cell. A second unidirectional dependency defines which cells the cell with the changed value is dependent on. For example, the first cell on the first board is dependent on a column of third cells of a third board. The first cell may be defined as an aggregation that summarizes what percentage of the column of third cells have completed computations. In other words, the bidirectional architecture maps relationships between parent and children. A certain cell may be a parent to one or more child cells, for example, mirror cells that monitor a certain cell. The same certain cell may be a child dependent on another parent cells, for example, the certain cell may be a mirror that monitors the parent cell.

The bidirectional dependencies provide the data that is used to compute the initial state of the dataset. Updates to specific cells may be performed using unidirectional dependencies, according to which cell is changed.

Optionally, cell dependencies are obtained by accessing a relational graph (e.g., dataset, database). The relation graph may document the bidirectional dependencies. The relational graph may be implemented as two datasets, each documenting a respective unidirectional dependency. Alternatively, the relational graph is implemented as a single dataset that documents the bidirectional dependencies.

The relations graph may be implemented as a graph. Alternatively, the relational graph is converted to a key-value format, for example, by walking the graph, and defining each connection as an entry in a key-value database.

The key of the key-value dataset implementation of the relational graph may denotes an identifier of a specific column of cells. The value of the key-value dataset may denote the specific cell within the specific column. It is noted that the key-value implementation, where the key indicates columns, is different than other approaches where the key denotes a row, and the value denotes a cell within the row. The key-value implementation, where the key denotes the column, and the value denotes the row, is selected to provide scalability, computational efficiency, ability to be distributed, resiliency, and simplicity. The key-value architecture is quickly queried, and/or quickly updated, and/or may be stored in a distributed data storage system, enabling batch access to a large number of queries, and/or fast response for large number of results. Designating the key of the key-value dataset to denote the column (or specific field), and the value of the key-value dataset to denote the specific cell, provides computational efficiency and/or reduced latency, since the entire record does not need to necessarily be accessed, changed, and re-stored. Rather, the field of the record is accessed, changed, and re-stored.

The relational graph may be implemented on a distributed storage system designed for simultaneous batch access by multiple queries for identifying dependencies between cells. The distributed storage of the relational graph enables batch access to the graph, simultaneously (or near simultaneously) by multiple queries, which is computationally efficient and/or fast, in comparison to sequential access. Moreover, the distributed storage avoids a single point of failure, for example, where the entire dataset goes down if the relational graph fails.

Optionally, dependencies between cells may be stored at the column level, and at the row level, rather than on a cell to cell level. Such architecture provides scalability for dependencies, for example, where millions of dependencies are documented. If cell to cell dependencies were stored, a change to a single cell may require updating millions of links in the graph, which is not scalable for large datasets that include large number of links and/or not computationally efficient. In contrast, using the architecture described herein wherein links are defined at the column and row level, links may be updated using batches, which incurs lower latency and/or is more computationally efficient.

To obtain dependencies of a certain cell (e.g., which has changed), the relational graph may be accessed by applying a first query to the relational graph to obtain a set of columns linked to the certain cell. A second query is applied to the relational graph to obtain a set of rows linked to the certain cell. Dependent cells which are dependent on the certain cell are obtained by performing an intersection operation on the set of columns and the set of rows.

At 208, one or more event messages indicating the change to the cell (i.e., to the parent cell) are generated. The event message(s) are sent to each dependent cell and/or to each column that includes each dependent cell and/or to each dataset that includes each dependent cell. Event messages may be sent to the column of each dependent cell, for locking the column, as described with reference to 210.

The event messages may be synchronously and/or asynchronously generated in response to the each change (e.g., in response to each received indication of change).

Event messages may be accumulated in a queue, for example, each respective column (which is capable of being locked as a whole) is associated with its own respective queue, for accumulating event messages destined for updating dependent cells of the respective column.

Optionally, two types of queues are implemented. A first type of queue is for accumulating received changes (e.g., as described with reference to 204. The first queue may accumulate a first type of event messages indicating changes to parent cell(s) (e.g., as described with reference to 204). A second queue is for accumulating an indication of which columns have dependent cells that are impacted by the change(s) accumulated in the first queue. The dependent cells may be identified as described with reference to 206. The second queue may accumulate a second type of event messages destined for columns that include the dependent cells which are to be updated with the with the first type of event message.

The term event message used herein refers to the second type of event messages, unless explicitly identified otherwise.

Separating between the core fields indicating the parent cells that have changed, and the dynamic fields indicating which dependent cells need to be changed, enables efficient sending of second event messages. The first queue monitors the changes to cells. The second queue is used to trigger the event messages based on which cells (e.g., columns) are affected by the change in the first queue, and therefore require a recalculation. The event messages are sent to the impacted boards and/or impacted columns and/or impacted cells. The event messages are executed in a batch, by locking the entire column and executing event messages that impact that column, which increases computational efficiency and/or reduces latency, as described herein.

The event message may be sent by distributing respective event messages to respective columns of each respective dataset that include a respective dependent cell.

At 210, multiple cells that include the dependent cell are locked (e.g., placed in a locked state). The multiple cells may include the same field as the field of the dependent cell.

Optionally, the column of a table/board that includes the dependent cell is locked.

It is noted that when multiple event messages for different dependent cells are created in response to a single change of a parent cell, multiple columns that include the multiple dependent cells are locked.

Locking of cells is done to prevent tampering with the contents of the cell before the cell has completed its update (e.g., computation) in response to a previous change. If cells were not locked during the update, a bizarre situation may occur where a user views the cell have a one value while at the same time another user changes the cell to have a different value, i.e., the real value of the cell then becomes undefined and/or unpredictable.

Locking may be synchronous or asynchronous. For example, synchronous and/or asynchronous locking may be triggered in response to receiving the event message. In another example, asynchronous locking may be triggered at predefined time intervals unrelated to the change to the parent cells. For example, code may determine which columns have continuous updates. Such columns may be locked, for example, every 500 milliseconds, every second, every 2 seconds, or other values.

As used herein, the term locking session refers to the time interval during which the cells (e.g., of the column) are locked, i.e., in a locked state.

At 212, a batch update of the locked cells (e.g., of the locked column) is done. The update is done by applying the update of the parent cell to the respective dependent cell, for updating the dependent cell. For example, when the dependent cell includes a defined formula and/or aggregation that uses data of the parent cell, the formula and/or aggregation is computed (or recomputed) using the updated data of the parent cell.

Exemplary updates of the locked cells include: assigning the value of the event message to a mirror cell, updating a filter applied to the locked cells using the value of the event message, updating an aggregation computation, automating a task using the value of the event message, and sorting the locked cells using the value of the event message.

The batch update may include additional event messages sent to the locked cells that were received before the locking, and optionally stored in a queue associated with the column. Alternatively or additionally, the batch update may include additional event messages received during the locking session, where the additional event messages arriving during the locking session are implemented. Event messages arriving after the current locking session has ended may be queued until the next locking session.

Optionally, the batch update of the locked cells is performed asynchronously with respect to the received indication of the change of the parent cell.

Optionally, the cells (e.g., of the column) are locked in response to a first event message that arrives at the column. Additional updates indicated by additional event messages arriving at the column during the current locking session are performed on the locked cells without triggering additional locking. The additional messages indicating triggering of the locking may be ignored, since the cells are already locked.

Optionally, the batch update of the locked cells is done by applying a diff operator to a previous value of each respective locked dependent cell and to the respective change indicated by the respective event message. The diff operator considers the change, applied to the previous value. The diff operator may avoid re-computing the entire value of the respective cell using data that has not changed. Using the diff operator provides scalability, by improving computational efficiency of the processor (e.g., reduced processing resource utilization, reduced memory utilization, reduction in computations, and reduction in processing time). For example, aggregation may be performed using the diff operator. A mirror cell may monitor other cells to determine when the other cells have completed computing their tasks. At a certain point in time, 90% of the other cells being monitored may have completed their tasks, and 10% may be stuck. When the status of the remaining cells changes from stuck to done, the other cells do not need to be recomputed. A diff operation may be done on the existing data using the new data.

Additional optional exemplary details of using the relational graph for accumulating changes to the dataset(s) using a speed layer and a batching layer are described, for example, with reference to U.S. patent application Ser. No. 17/565,731, which is co-filed with the present application, and incorporated herein by reference in its entirety.

At 214, the locking of the cells (e.g., the column) is released.

Locking may be released when a predefined amount of time (i.e., maximum locking time) has elapsed, for example, 10 milliseconds, or 100 milliseconds, or other values. Alternatively or additionally, locking may be released when a queue accumulating event messages has been processed (e.g., emptied, or event messages processed within a certain time interval) and implemented as the batch update, i.e., no event messages are pending.

New event messages arriving after the release of a current locking session may be queued until a next locking session. The updates indicated by the new event messages are performed during the next locking session. There may be a minimum and/or maximum time between locking sessions, for example, to provide real time updates while avoiding back to back locking sections and/or avoiding overloading the processor.

At 215, the change(s) to the locked cell(s) of the column may trigger a propagation. The propagation may be implemented by one or more iterations of features described with reference to 204-214. The next iteration is referred as the current iteration, while the recently completed iteration is referred to as the previous iteration. The previously performed update (e.g., re-computation) of the locked cell(s) of the column (performed during the previous iteration) may be considered as triggered changed to the cell(s) in the current iteration, by referring back to 204. Now, in 206, dependent cells which are dependent on the previously locked cell(s) that were previously updated, are currently identified in the current iteration, by referring back to 206. Current event message are sent to the currently identified dependent cells during the current iteration, by referring back to 208. Currently identified columns that include the currently identified dependent cells are locked in the current iteration, by referring back to 210. A current batch update of the currently locked cells of the currently locked column is performed, by referring back to 212. The currently locked column is released, by referring back to 214. Another iteration may be triggered using the updated values of the cells of the column, by referring back to 215.

The propagations that trigger the additional iterations, may trigger further propagations, until all dependencies of the initially changed cells have been traversed. In the case of a cyclical relational graph, where a dependency path is cyclical, the propagations may continue indefinitely without a clear termination. However, it is noted that the locking of the column and batch updating is designed to handle large number of updates, which may arise from cyclical dependencies leading to non-terminating updates, in a computationally efficient manner.

At 216, a presentation of the dataset that includes the parent cell(s) and/or dependent cell(s) is updated, for depicting the updated value of the parent cell(s) and/or dependent cell(s). The presentation may include a browser presenting the dataset on a display of one or more client terminals.

It is noted that the indication of the change of the parent cell (e.g., as described with reference to 204) may be received from a first client terminal presenting a parent dataset. Another dataset that include dependent cells which were updated in response to the change to the parent cell may be presented within a respective browser presented on a respective display of one or more other client terminals (which are different from the client terminal presenting the parent dataset). For example, multiple users each work on a respective work board at a respective client terminal. An administrator views a dashboard on an administrative client terminal. The dashboard aggregates data from the work boards, for example, presenting a summary of what percentage of users completed their work. The dashboard is dynamically updated based on updates of each user entered into their respective work board.

Additional optional exemplary details of updating a presentation of the dataset(s) that includes the dependent cell(s) in response to a scrolling action by the browser is described, for example, with reference to U.S. patent application Ser. No. 17/565,767, which is co-filed with the present application, and incorporated herein by reference in its entirety.

At 218, one or more features described with reference to 204-216 are iterated. For example, to provide real time updates of dataset(s).

Referring now back to FIG. 3, the flow described with reference to FIG. 3 depicts one or more of: accumulation of changes using a relational graph (e.g., as described with reference to U.S. patent application Ser. No. 17/565,731), locking of one or more columns that include dependent cells (e.g., as described herein), and dynamic updating of cells impacted by the change that are presented within a browser window of a client terminal scrolling the dataset (e.g., as described with reference to U.S. patent application Ser. No. 17/565,767).

Data flow 302 relates to determining dependent cells for updating in response to a change in status of a cell 304. Data flow 306 relates to accumulating changes to cells of the dataset.

In flow 302, a change status of a cell 304 is received. Exemplary changes include, for example, a change in a value the cell, a configuration change (e.g., configuration of the column of the cell, such as presentation of values as dollars, which column to present), a change in linkage (e.g., board linkage, to/from mirror cell, to/from formula cell), entity change (e.g., user name changed), and time change (e.g., when formula is based on time). The change status may be, for example, in response to manual user input, in response to a cell performing a dynamic calculation (e.g., start of calculation, end of calculation), and in response to data obtained from an external source (e.g., sensor, external database, another board). At 306, the column of the cell is updated with the change. At 308, a dataset (e.g., database) 310 is updated with the change. At 312, one or more parameters are computed and/or set for the cell, using the updated value from 306, and/or using definitions of the parameters, using and/or historical values 314 obtained from the dataset 310. Examples of parameters calculated for the cell include: whether the cell has completed its calculations or not (e.g., True or False), color of the cell presented within a browser of a client terminal (e.g., dependent on whether calculations have been done or not, for example, green when done, red when not done), and version (e.g., sequentially documenting changes to the cell). The calculated values may be stored in a calculated items dataset (e.g., database) 350. At 316, one or more dependent cells, of one or more columns, of the same board and/or other boards, are updated according to the change in cell status 304. The dependent cells that are updated are determined according to a relational graph (e.g., database) 318, which maps dependencies between cells, as described herein. At 320, event messages indicating the updates for the dependent cells may be created and stored in a queue. Event messages may be queued according to the column of the dependent cell corresponding to each event messages. For example, a queue per column. For example, as described herein. At 322, columns that include the dependent cells are updated, optionally using the events in the respective queue 320. The updating may be done by locking each receptive column as a whole, and applying multiple changes to multiple cells within the column (from the respective queue) during the same locking session, as described herein.

At 324, the updated cell is accumulated and documented. The updated cell value 326 is documented in a speed layer 328, that documents changes and/or updates to cells of the dataset within a recent time interval (e.g., last hour, last half hour, last 2 hours, or other values). A timer 330 may trigger updating of a batching layer 332 with the contents of speed layer 328. For example, when a time threshold is met, such as when an hour during which speed layer 328 has been updated has passed, the values of speed layer 328 are used to update historical values of batching layer 332. Batching layer 332 documents historical changes of cells of the dataset, from inception until the most recent time threshold (e.g., current hour). Batching layer 332 may be implemented as a key-value database (e.g., implemented in Cassandra) 334, as described herein.

Referring now back to FIG. 4, dependencies may be between cells, and/or between cells and other entities, such as users, configurations, and timers. Four exemplary boards 402A-D with respective cells are depicted. It is noted that board 402D has not dependencies currently documented in the relational graph. Dependency line 404 indicates that a mirror cell 406 of board 402C monitors cell 408 of board 404A. Dependency line 410 indicates that a mirror cell 406 of board 402C monitors cell 412 of board 404B. Dependency line 412 indicates that a people cell 414 is dependent on a user entity. Formula cell 416 has multiple dependencies, indicates by dependency line 418 indicating dependency on people cell 414, dependency line 420 indicating dependency on date cell 422, dependency line 422 indicating dependency on mirror 406 (which is dependent on cell 408 of board 402A via dependency line 404 and on cell 412 of board 402B via dependency line 410), dependency line 424 indicating dependency on column configuration 426, and dependency line 428 indicating dependency on a timer 430 (e.g., that provides a current time).

Referring now back to FIG. 5, an event indicating a change in a value of a cell 502 of a dataset is obtained. Speed layer 504, which documents and accumulates recent changes within a current time interval (e.g., current hour) is updated. A scheduled flush 506 is performed, for example, at preset intervals, for example, every hour. The accumulated changes of speed layer 504 are added to batching layer 508, which documents and accumulates historical changes prior to the current scheduled flush. Batching layer 508 is stored as a key-value dataset, where each key indicates a certain column of the dataset, and each value indicates the cell within the column.

A query/serving layer 512 receives a query for execution on the dataset. The query is executed on the real time status of the dataset, which is represented as a combination of the current state of the speed layer, i.e., recent data 514, and the batching layer, i.e., old data 516. Recent data 514 and old data 516 may be fed into a point of delivery (POD) 518. The real time dataset is created by combining recent data 514 (indicating recent changes to cells of the dataset) and old data 516 (indicating historical changes to cells of the dataset), optionally by an orchestrator 520. Query service 522 executes the query twice. First, on the real time dataset (created from the combination of recent data 514 and old data 516), which is represented as key-values indicating columns, to obtain columns. The query is then executed on a row store 524 to obtain rows. The column result is intersected with the row result to obtain cells in response to the query, which are provided to the user 526 (i.e., the client terminal used by the user).

Referring now back to FIG. 6, The locking is described, for example, with reference to 210 of FIG. 2. The batch updating is described, for example, with reference to 212 of FIG. 2. A dataset 602 includes cells 602A-C, a dataset 604 includes cells 604A-B, and a dataset 606 includes a first column 610 of cells 606A-D, and a second column 612 of cells 606E-H. Cell 606A is dependent on cell 602B. Cell 606C is dependent on cell 602C, and on cell 604A. Cell 606D is dependent on cell 604B. Now, when an update arrives, for example, from cell 602B to update cell 606A, cells 606A-D of column 610 are locked. The locking may be in response to receiving the update, and/or triggered at predefined intervals. The locking of column 610 may be for a predetermined amount of time, and/or until updates of cells of column 610 located in a queue have been implemented. Updates of other cells of column 610 are performed during the same locking session during which cell 606A is updated. For example, Cell 606C is updated according to cell 602C and cell 604A, and cell 606D is updated according to cell 604B. The locking of column 610 and updating of multiple cells with multiple updates, is in contrast, for example, to standard approaches in which each update triggers a lock of a single cell, which result in repeated locking and releasing of individual cells in response to individual updates.

Various embodiments and aspects of the present invention as delineated hereinabove and as claimed in the claims section below find experimental and/or calculated support in the following examples.

EXAMPLES

Reference is now made to the following examples, which together with the above descriptions illustrate some embodiments of the invention in a non limiting fashion.

Referring now back to FIG. 7, four experiments were performed, using a dataset with two columns and a custom sort. During each experiment, three measurements were made: fetch and parse 704, filter 706, and total query 708. X-axis 710 indicates the increasing number of cell (i.e., items) of the dataset used in each experiment, i.e., 1000, 10000, 100000, and 500000. Y-axis 712 indicates the response time in milliseconds. As seen in graph 702, the response time remains reasonable even for datasets with 500000 cells.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant datasets will be developed and the scope of the term dataset is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for dynamically updating data in dataset, comprising:
    at least one processor executing a code for:
        receiving an indication of trigger for a change of a first cell of a plurality of cells of a dataset;
        updating the first cell according to the trigger;
        determining a second cell dependent on the first cell;
        sending to the second cell, an event message indicating the update of the first cell;
        locking a column of a plurality of cells that include the second cell and a plurality of other cells; and
        re-computing values of the second cell and plurality of other cells of the locked column, by performing a batch update of the cells of the locked column according to the event message, and according to additional event messages sent to the plurality of cells of the locked column that are at least one of: received before the locking, and received during the locking.

2. The system of claim 1, wherein the re-computing values of the locked second cells of a triggers a propagation implemented in at least one iteration, wherein the re-computed values of the locked column represents the indication of trigger for change of a third cell of the plurality of cells of the dataset, wherein the determining comprises determining a fourth cell dependent on the third cell, wherein the sending comprises sending to the third cell, wherein locking comprises locking the column that includes the third cell, and wherein re-computing comprises re-computing values of the third cell.

3. The system of claim 1, wherein the event message is at least one of synchronously and asynchronously generated in response to the receiving the indication of the change.

4. The system of claim 1, wherein the batch update of the plurality of locked cells is performed asynchronously with respect to the receiving the indication of the change.

5. The system of claim 1, further comprising code for releasing the locking when a queue of the additional event messages has been processed and implemented as the batch update.

6. The system of claim 1, further comprising code for updating a presentation of at least one second dataset presented on a display of at least one client terminal, for including the updated plurality of cells that include the at least one second cell.

7. The system of claim 1, wherein a dataset comprises a board including at least one table of the plurality of cell arranged as columns.

8. The system of claim 1, wherein the locking is released after a preselected amount of time has elapsed.

9. The system of claim 1, wherein new event messages arriving after the release of a current locking are queued until a next locking, and updates indicated by the new event messages are performed during the next locking.

10. The system of claim 1, wherein the locking is triggered at predefined time intervals.

11. The system of claim 1, wherein the plurality of cells are locked in response to a first event message, and additional updates indicated by additional event messages sent during while the plurality of cells are locked are performed on the locked cells without triggering additional locking.

12. The system of claim 1, wherein the indication of trigger for change to the first cell is selected from a group consisting of: direct a change of a value of the first cell, an indirect change of the value of the first cell due to a change of another cell linked to the first cell, a configuration change impacting the first cell, a change in linkage of the first cell, a change of time used for computation by the first cell, a change in entity assigned to the first cell, a change in a definition of an automated task impacting the first cell, and a force recalculation of a formula impacting the first cell.

13. The system of claim 1, wherein updating the plurality of locked cells is selected from a group consisting of: assigning the value of the event message to a mirror cell, updating a filter applied to the plurality of cells using the value of the event message, updating an aggregation computation, automating a task using the value of the event message, and sorting the plurality of cells using the value of the event message.

14. The system of claim 1, wherein the batch update of the plurality of locked cells is done by applying a diff operator to a previous value of each respective cell and to the respective change indicated by the respective event message.

15. The system of claim 1, wherein the first cell is of a first dataset, and the second cell dependent on the first cell is of a second dataset different from the first dataset.

16. The system of claim 15, wherein the indication of the trigger for change of the first cell is received from a first client terminal presenting the first dataset, and the at least one second dataset that is updated is presented a respective display of at least one second client terminal different from the first client terminal.

17. The system of claim 1, further comprising code for:
    accumulating in a first queue, event messages indicating a plurality of changes to a plurality of first cells, and
    accumulating in a second queue, a plurality of event messages indicating columns that include a plurality of second cells to be updated with the event messages.

18. The system of claim 1, wherein sending comprises distributing the event message to respective columns of a respective dataset that include a respective second cell dependent on the first cell, to trigger locking of cells of each respective column.

19. A method of dynamically updating data in dataset, comprising:
    receiving an indication of trigger for a change of a first cell of a plurality of cells of a dataset;
    updating the first cell according to the trigger;
    determining a second cell dependent on the first cell;
    sending to the second cell, an event message indicating the update of the first cell;
    locking a column of a plurality of cells that include the second cell and a plurality of other cells; and
    re-computing values of the second cell and plurality of other cells of the locked column, by performing a batch update of the cells of the locked column according to the event message, and according to additional event messages sent to the plurality of cells of the locked column that are at least one of: received before the locking, and received during the locking.

20. A non-transitory medium storing program instructions for dynamically updating data in dataset, which, when executed by at least one processor, cause the at least one processor to:
- receive an indication of trigger for a change of a first cell of a plurality of cells of a dataset;
- update the first cell according to the trigger;
- determine a second cell dependent on the first cell;
- send to the second cell, an event message indicating the update of the first cell;
- lock a column of a plurality of cells that include the second cell and a plurality of other cells; and
- re-compute values of the second cell and plurality of other cells of the locked column, by performing a batch update of the cells of the locked column according to the event message, and according to additional event messages sent to the plurality of cells of the locked column that are at least one of: received before the locking, and received during the locking.

* * * * *